United States Patent
Deleeuw

(10) Patent No.: US 7,127,468 B2
(45) Date of Patent: Oct. 24, 2006

(54) CONTEXT MONITORING DISPLAY DRIVER

(75) Inventor: William Deleeuw, Portland, OR (US)

(73) Assignee: Intel Corporation, Santa Clara, CA (US)

(*) Notice: Subject to any disclaimer, the term of this patent is extended or adjusted under 35 U.S.C. 154(b) by 546 days.

(21) Appl. No.: 10/397,948

(22) Filed: Mar. 25, 2003

(65) Prior Publication Data
US 2003/0187838 A1 Oct. 2, 2003

Related U.S. Application Data

(63) Continuation of application No. 09/467,996, filed on Dec. 20, 1999, now Pat. No. 6,560,603.

(51) Int. Cl.
G06F 17/30 (2006.01)
(52) U.S. Cl. .................................................... 707/102
(58) Field of Classification Search ............ 707/1–10, 707/200–205, 100–104.1; 345/589
See application file for complete search history.

(56) References Cited

U.S. PATENT DOCUMENTS

| 6,104,359 A | * | 8/2000 | Endres et al. ............... 345/589 |
| 6,108,670 A | * | 8/2000 | Weida et al. ............... 707/203 |
| 6,199,099 B1 | | 3/2001 | Gershman et al. |
| 6,356,905 B1 | | 3/2002 | Gershman et al. |
| 6,377,944 B1 | | 4/2002 | Busey et al. |

* cited by examiner

Primary Examiner—Diane Mizrahi
(74) Attorney, Agent, or Firm—Fish & Richardson P.C.

(57) ABSTRACT

A computer system includes a display device, a storage device on which an application program is stored, and a processor. The processor retrieves the application program from the storage device and, under control of the application program, generates or receives a text string to be displayed on the display device. An information management engine receives the text string and uses it to generate a list of sources of information related to the text string. A display driver delivers the text string both to the display device for rendering and to the information management engine. The display driver also receives the list from the information management engine and delivers it to the display device for rendering.

29 Claims, 4 Drawing Sheets

CONTEXT MONITORING DISPLAY DRIVER

CROSS-REFERENCE TO RELATED APPLICATIONS

This application is a continuation application of and claims priority to U.S. application Ser. No. 09/467,996, filed Dec. 20, 1999 (now U.S. Pat. No. 6,560,603).

TECHNOLOGICAL FIELD

This application involves computer-implemented techniques for collecting, displaying, and manipulating digital information.

BACKGROUND

The proliferation of the Internet, as well as commercial and private intranets, has put vast amounts of information in the hands of everyday computer users. In general, a user can obtain a virtually limitless amount of information on virtually any topic within minutes.

It is very common for a person to consult the Internet or a private intranet when gathering information for use in preparing a document. In general, the person gathers information on a particular topic by performing a keyword search of the Internet or intranet, reviews the collected information, and then prepares the document, drawing upon the collected information. Many computer systems allow the user to view some of the collected information in one window while preparing a document in another window. The amount of useful information gathered during the keyword search depends primarily on the user's skill in formulating the search. Information being searched for typically has some relation to information currently displayed on the monitor. This new information, in turn, tends to guide the user to still more related material by exposing them and their resulting queries to more focused or even tangential material.

SUMMARY

A computer system includes a display device, a storage device on which an application program is stored, and a processor. The processor retrieves the application program from the storage device and, under control of the application program, generates or receives at least one text string to be displayed on the display device. An information management engine receives these strings and uses them to generate a list of sources of information related to the text strings. A display driver delivers the text strings both to the display device for rendering and to the information management engine. The information management engine finds related information. The display driver or other application program subsequently receives this list of related material from the information management engine and delivers it to the display device for rendering.

Other embodiments and advantages will become apparent from the following description and from the claims.

DETAILED DESCRIPTION

Figure 1:
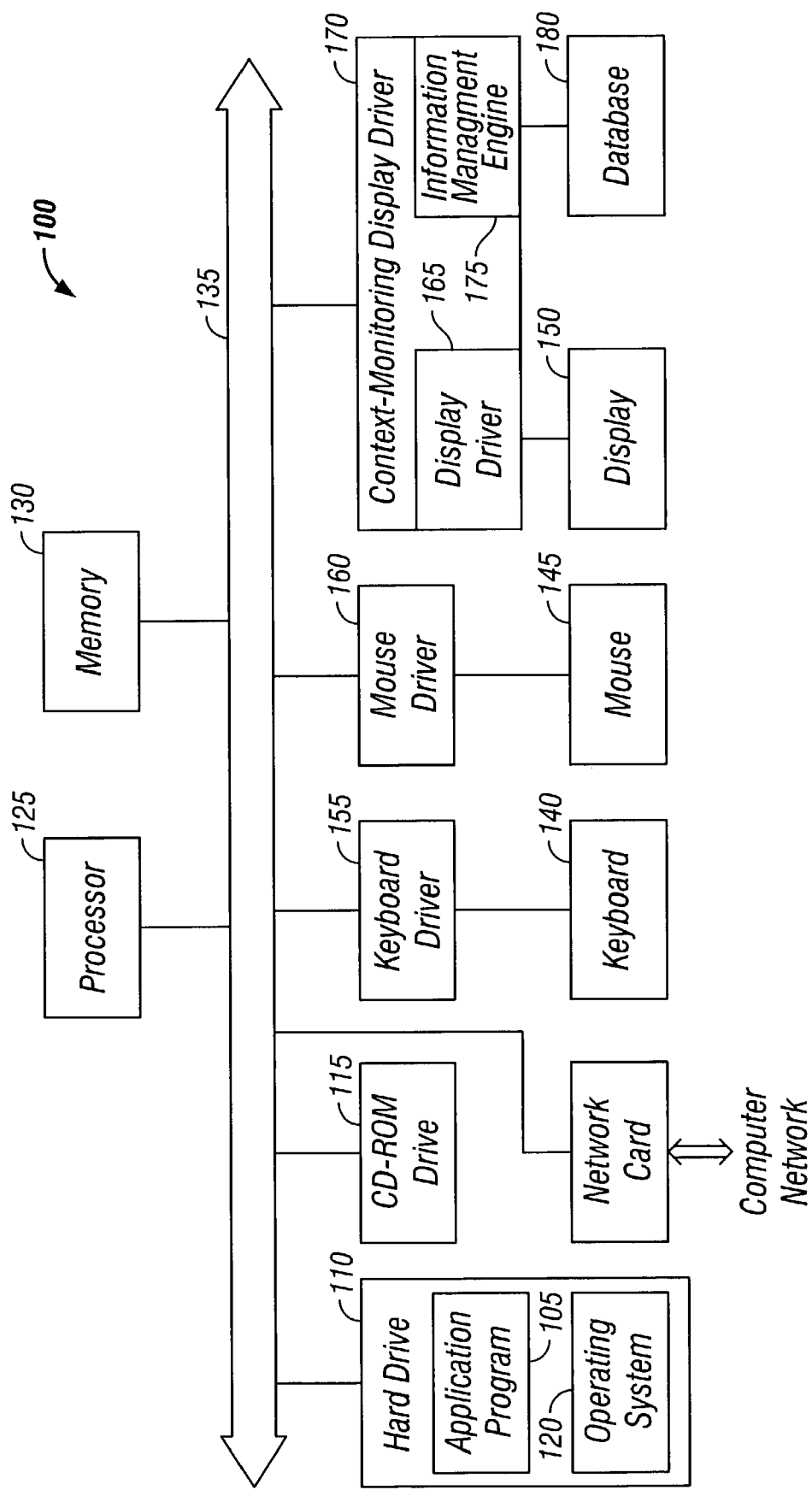
FIG. 1 is a block diagram of a computer system equipped with a context-monitoring display driver.

FIG. 1 shows a computer system 100 configured to monitor the context of a user's interaction with one or more application programs, such as a word-processing application 105, running on the computer 100. The computer 100 uses the context of this interaction to automatically identify information sources, such as word-processor documents and HTML pages, that are likely to contain information relevant to the user's current activity. In general, the computer 100 displays the names of at least some of the identified sources and provides hyperlinks to the locations at which these sources are stored. The computer 100 thus places an assortment of relevant information at the user's fingertips as the user works.

The computer 100 includes one or more application programs 105 stored on a storage medium, such as a fixed disk 110 or a CD-ROM 115, mounted in a corresponding drive. The computer 100 also includes an operating system 120, such as the Microsoft Windows 98 or Unix operating system, stored on the fixed disk 110. The application programs 105 and the operating system 120 include executable instructions that are carried out by one or more processors 125. In general, the processor 125 retrieves these instructions from a temporary storage medium, such as a random access memory (RAM) module 130. One or more data buses 135 couple the processor 125, directly or indirectly, to the memory module 130, the disk drives and also optionally to a network.

The computer 100 also includes a variety of input and output devices, such as a keyboard 140, a mouse 145, and a display device 150. The keyboard 140 allows the user to enter text into the computer 100. The display device 150 allows the computer to display graphics and text to the user. The mouse 145 allows the user to scroll through and select the information displayed on the display device 150.

For each of these input and output devices, the computer 100 includes a corresponding hardware driver that facilitates communication between the operating system and applications and the corresponding device. A keyboard driver 155 passes information between the operating system and/or application and the keyboard 140; a mouse driver 160 passes information between the operating system and/or application and the mouse 145; and a display driver 165 passes information between the operating system and/or application and the display device 150.

In general, the user enters information through the keyboard 140 and/or selects displayed information with the mouse 145. The corresponding drivers pass this information to the operating system 120, which then passes the information to the application program 105. The application program 105 processes the incoming information and generates corresponding output information. The operating system 120 receives the output information from the application program and, when necessary, passes this information to the display driver 165. The display driver 165 then displays the information on the display device 150.

Unlike a conventional computer system, the computer 100 shown here includes another display driver, known as the context-monitoring (CM) display driver 170. The CM driver 170 acts as an intermediary between the operating system and/or application and the display driver 165. The CM driver 170 inspects the data flowing between the operating system and/or application and the display driver 155 and uses this data to decipher the context of the user's interaction with the application program 105.

In general, the CM driver 170 intercepts some or all of the information flowing between the operating system 120 or application program 105 and the display driver 165. The CM driver 170 identifies pieces of this information that might indicate the context of the user's interaction with the computer 100. For example, when the user interacts with a word-processing application, all of the text strings entered by the user or already existing within the document and being read by the user are displayed on the display device 150 and therefore must pass from the application program 105 to the display driver 165. The CM driver 170 copies these text strings and uses them to search for information that might be relevant to the user's topic. The CM driver 170 also monitors text strings generated by the computer 100 in response to the user's actions. The contents of an HTML web page are one example of text strings generated by the computer and not by the user. The CM driver 170 passes the text strings on to the display driver 165 after copying them.

The CM driver 170 includes, or is linked to, an information management engine 175, such as Intel's Escher 2.0 embedded management engine. The information management engine (IME) 175 maintains a database 180 of information drawn from a wide variety of sources, such as word processor documents, HTML documents, electronic mail messages, and graphical presentation documents, like those generated by Microsoft's PowerPoint application. In one embodiment, the IME may search for new information at the time a text string is intercepted by the CM driver. The information management engine 175 receives the text strings copied by the CM driver 170 and uses the strings to retrieve information from the database 180 or from other sources as may be available such as but not limited to HTML or hard drive or network files. In general, information management engines like Intel's Escher 2.0 engine can query the database 180 loosely, searching for information related to a search term instead of searching only for the term itself.

The CM driver 170 receives a list of sources, or documents, found in the information management engine's search. Alternatively this information can be sent to another application to provide another user interface. In some embodiments, the information management engine 175 assigns a ranking to each of these sources, indicating the likelihood that the source contains information relevant-to the user's topic. The CM driver 170 can assist in this ranking by copying information about the display attributes, such as font size and color, of the copied text strings. The CM driver 170 passes the list to the display driver 165 or to another application which, in turn may pass the list to the display driver. The display driver 165 displays the list on the display device 150.

The user can view one of the documents by selecting the document from the list. When the user selects one of the documents, the operating system 120 launches the corresponding application program and opens the document.

Figure 2:
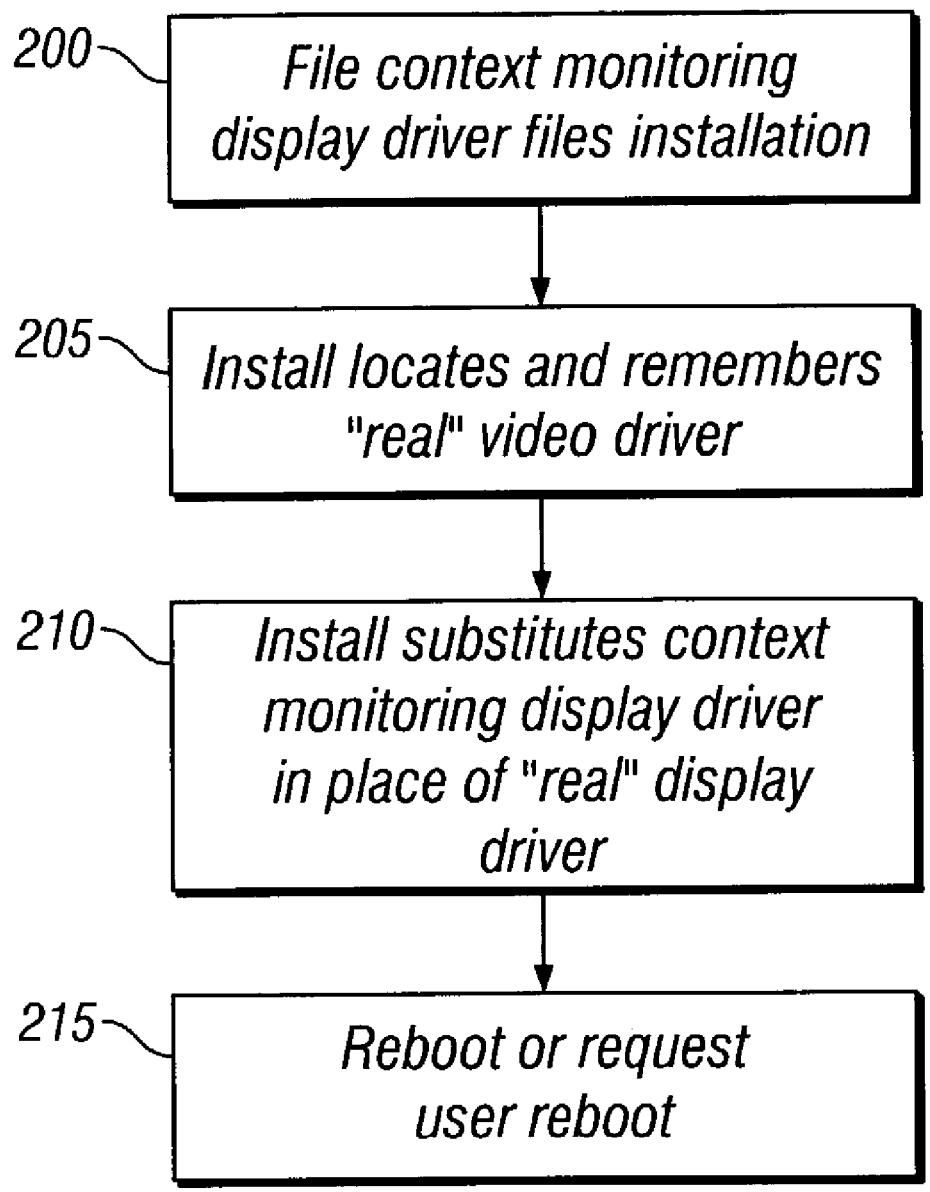
FIGS. 2, 3 and 4 are flow charts illustrating the installation, start-up and operation of the context-monitoring display driver.

FIG. 2 illustrates a sequence for use in installing the context-monitoring driver 170. The computer's processor 125, under the control of an installation program, installs the program and data files that make up the CM driver 170 (step 200). The installation program also locates and stores the address of the display driver 165 (step 205). The installation program substitutes the display settings and hardware ID of the CM driver 170 for those of the display driver 165 in the system's device register (step 210). This ensures that the operating system 120 calls the CM driver 170 instead of the display driver 165 when delivering information to be rendered on the display device 150. The installation program then reboots the system or prompts the user to initiate a reboot (step 215).

Figure 3:
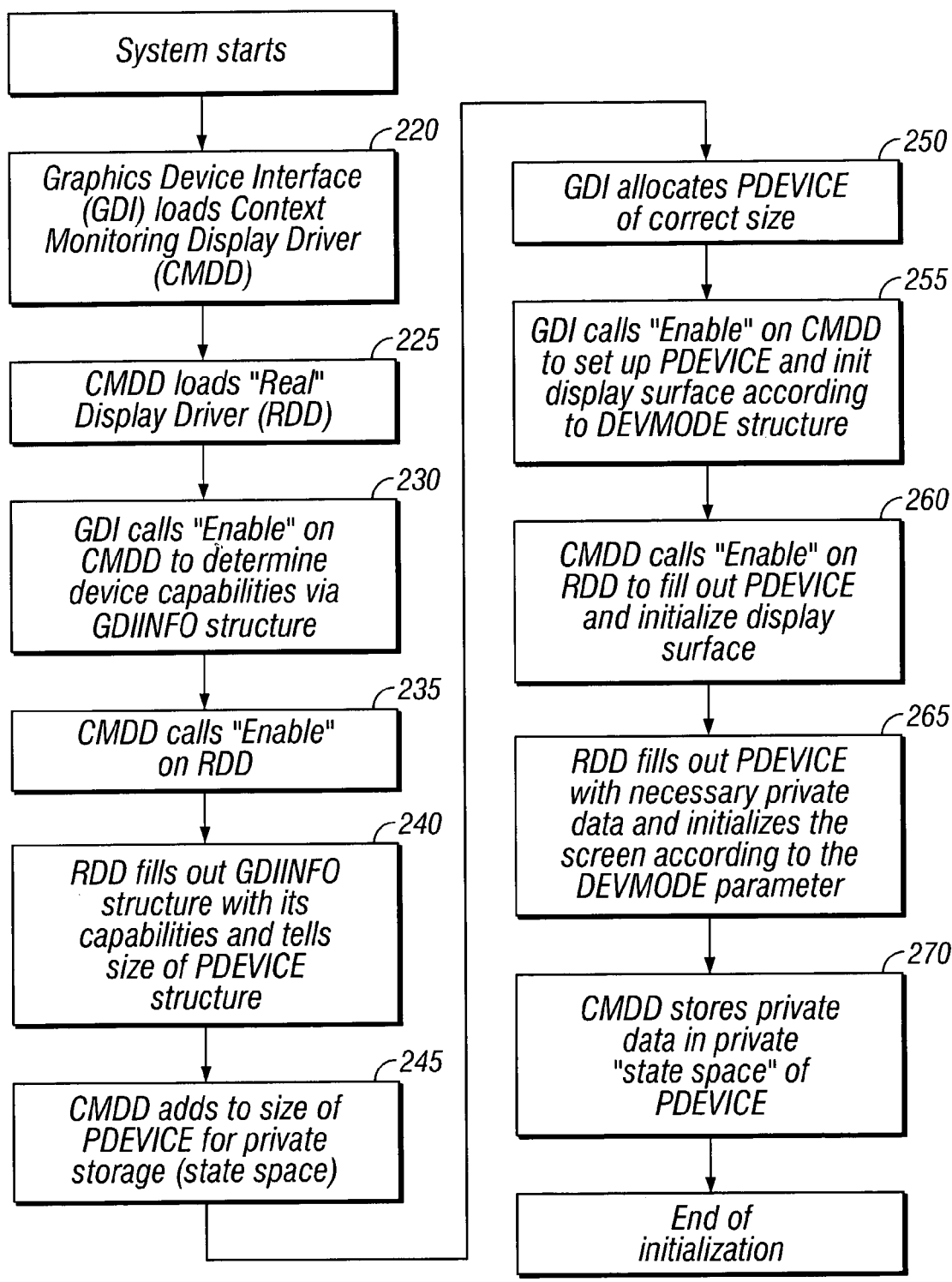

FIG. 3 shows an example start-up sequence for a context-monitoring display driver in an IBM-compatible computer running on the Microsoft Windows 98 platform. At system start-up, the Windows Graphics Device Interface (GDI) loads the CM driver (step 220). The CM driver requests the operating system to load the actual display driver (step 225). The Windows GDI executes an "Enable" routine on the CM driver to determine the capabilities of the CM driver using the Windows GDIINFO structure (step 230). The CM driver responds by calling an "Enable" routine on the actual display driver to determine the capabilities of the actual display driver (step 235). The actual display driver inserts information about its capabilities into the GDIINFO structure and indicates the size of its PDEVICE structure (step 240). The CM driver pads the size of the PDEVICE structure to accommodate private storage, known as "state space," and returns the PDEVICE size to the Windows GDI (step 245). The Windows GDI allocates the appropriate amount of PDEVICE storage space (step 250).

The Windows GDI again calls the "Enable" routine on the CM driver to set up the PDEVICE structure and to initialize the display surface according to the Windows DEVMODE structure (step 255). The CM driver calls the "Enable" routine on the actual display driver to fill out the PDEVICE structure and to initialize the display surface (step 260). The actual display driver inserts the necessary private data into the PDEVICE structure and initializes the display device according to the DEVMODE parameter (step 265). The CM driver then stores its own private data in the "state space" allocated within the PDEVICE structure (step 270).

Figure 4:
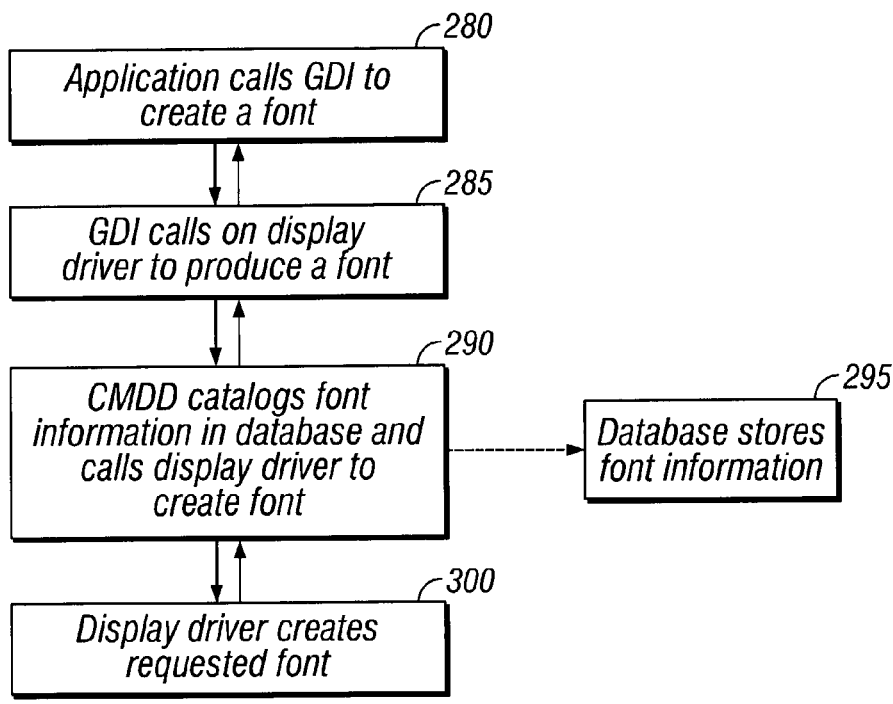
Figure 4:
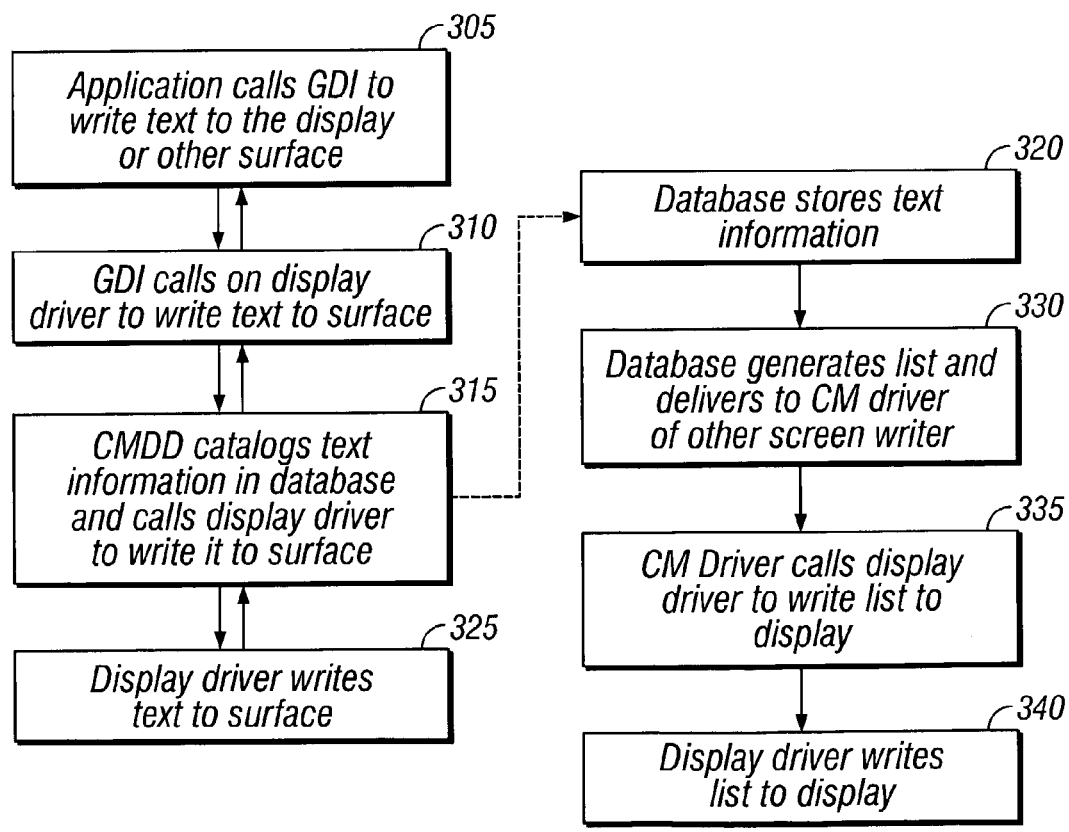

FIG. 4 shows how text is handled in the computer system. An application program generates a text string or receives a text string from the user and calls the Windows GDI to create a font (step 280). The Windows GDI calls the CM driver to produce the font (step 285). The CM driver delivers the font information to the information management engine and calls the actual display driver to create the font (step 290). The information management engine stores the font information (step 295), and the actual display driver creates the requested font (step 300).

The application program then calls the Windows GDI to write the text string to the display device (step 305) using the font created in steps 280–290. The Windows GDI in turn calls the CM driver to write the text string to the display device (step 310). The CM driver delivers the text string to the information management engine and calls the actual display driver to write the text string to the display device (step 315). The information management engine uses the text string to search the database or other available information SRC (step 320). The actual display driver writes the text string to the display device (step 325).

After searching the database, the information management engine organizes the information found during the search into a list of sources (step 330). The CM driver receives the list and calls the actual display driver to write the list to the display device (step 335). In an alternative embodiment, the IME delivers the list to a running application which may filter, reorder or modify its contents and present it through the OS and display driver. The display driver writes the list to the display device, which allows the user review the list and retrieve the sources shown in the list (step 340).

A number of embodiments of the invention are described above. A person of ordinary skill will recognize that various modifications are possible without departing from the spirit and scope of the invention. For example, in some embodiments, the CM driver monitors, or snoops, only some of the information flowing between the operating system and the display driver. In these embodiments, the operating system is instructed to send only certain types of information, such as text and font instructions, to the CM driver. The operating system sends all other display-related instructions directly to the display driver. This solution is less robust and less stable than that described above, but it increases processing speed and efficiency by reducing the amount of information that passes through the CM driver before reaching the display driver. Accordingly, other embodiments are within the scope of the following claims.

What is claimed is:

1. A computer-implemented method comprising:
    automatically intercepting, in a context-monitoring driver, text data in machine-display output requests generated by an operating system or application program; and
    delivering the intercepted text data to an information management engine that determines a semantic context indicated at least in part by the text data.

2. The method of claim 1, wherein intercepting text data comprises:
    receiving the machine-display output requests;
    identifying the text data in at least one of the machine-display output requests; and
    initiating processing of the machine-display output requests.

3. The method of claim 2, wherein initiating processing of the machine-display output requests comprises delivering the output requests to a display driver that processes the output requests, including rendering of the text data in a display device.

4. The method of claim 3, wherein the display driver and the information management engine are embedded in a single context monitoring display driver on a machine.

5. The method of claim 1, wherein intercepting text data comprises inspecting all machine-display output requests sent to a display device.

6. The method of claim 1, wherein intercepting text data comprises inspecting only a portion of machine-display output requests sent to a display device.

7. The method of claim 1, wherein the information management engine generates a list of information sources based on the determined context.

8. The method of claim 7, wherein the information management engine generates the list of information sources based at least in part on searching of a resource using the determined context, the determined context including information related to at least one word from the text data.

9. The method of claim 8, wherein the resource comprises a network.

10. The method of claim 8, wherein the resource comprises a database.

11. The method of claim 7, further comprising:
    receiving the list of information sources from the information management engine; and
    presenting the list of information sources indicating potentially relevant information.

12. The method of claim 11, wherein presenting the list of information sources indicating potentially relevant information comprises indicating assigned rankings of at least portion of the information sources, the assigned rankings being based at least in part on font information related to the text data.

13. The method of claim 7, wherein intercepting text data comprises intercepting text data entered by a user in a first application and intercepting text data in documents obtained by a second application.

14. An article comprising a computer-readable storage medium embodying information indicative of instructions that when performed by one or more machines result in operations comprising:
    automatically intercepting, in a context-monitoring driver, text data in machine-display output requests generated by an operating system or application program; and
    delivering the intercepted text data to an information management engine that determines a semantic context indicated at least in part by the text data.

15. The article of claim 14, wherein intercepting text data comprises:
    receiving the machine-display output requests;
    identifying the text data in at least one of the machine-display output requests; and
    initiating processing of the machine-display output requests.

16. The article of claim 15, wherein initiating processing of the machine-display output requests comprises delivering the output requests to a display driver that processes the output requests, including rendering of the text data in a display device.

17. The article of claim 14, wherein the information management engine generates a list of information sources based on the determined context.

18. The article of claim 17, wherein the information management engine generates the list of information sources based at least in part on searching of a resource using the determined context, the determined context including information related to at least one word from the text data.

19. The article of claim 18, wherein the resource comprises a network.

20. The article of claim 18, wherein the resource comprises a database.

21. The article of claim 17, wherein the operations further comprise:
    receiving the list of information sources from the information management engine; and
    presenting the list of information sources indicating potentially relevant information.

22. The article of claim 21, wherein presenting the list of information sources indicating potentially relevant information comprises indicating assigned rankings of at least portion of the information sources, the assigned rankings being based at least in part on font information related to the text data.

23. The article of claim 14, wherein intercepting text data comprises intercepting text data entered by a user in a first application and intercepting text data in documents obtained by a second application.

24. An article comprising a computer-readable storage medium embodying information indicative of instructions that when performed by one or more machines result in operations comprising:
    installing program and data files of a semantic context-monitoring display driver that automatically intercepts text data in machine-display output requests generated by an operating system or application program;
    locating an address of an existing display driver;
    substituting the context-monitoring display driver for the existing display driver in system configuration settings; and initiating a reboot that causes loading of the context-monitoring display driver.

25. The article of claim 24, wherein initiating a reboot comprises prompting a user to initiate the reboot.

26. The article of claim 24, wherein the program and data files of the context-monitoring display driver cause padding of a display-device structure during an enable routine after the reboot to accommodate private storage of the context-monitoring display driver.

27. An apparatus comprising:

computer-based context-monitoring means for automatically intercepting text data as the text data is delivered to a display driver from an operating system or application program; and computer-based means for determining a semantic context indicated at least in part by the text data.

28. The apparatus of claim 27, wherein the means for intercepting text data comprises a context-monitoring display driver acting as an intermediary between applications and an underlying system display driver.

29. The apparatus of claim 28, wherein the means for determining a context comprises an information management engine that determines the context and generates a list of information sources based on the context.

* * * * *